United States Patent
Abe et al.

(10) Patent No.: US 12,149,287 B2
(45) Date of Patent: Nov. 19, 2024

(54) UPBANDWIDTH ALLOCATION DEVICE AND UPLINK BANDWIDTH ALLOCATION METHOD

(71) Applicant: Nippon Telegraph and Telephone Corporation, Tokyo (JP)

(72) Inventors: Takuya Abe, Musashino (JP); Tomohiko Ikeda, Musashino (JP); Satoshi Narikawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 266 days.

(21) Appl. No.: 17/786,308

(22) PCT Filed: Jan. 7, 2020

(86) PCT No.: PCT/JP2020/000194
§ 371 (c)(1),
(2) Date: Jun. 16, 2022

(87) PCT Pub. No.: WO2021/140573
PCT Pub. Date: Jul. 15, 2021

(65) Prior Publication Data
US 2023/0025050 A1    Jan. 26, 2023

(51) Int. Cl.
*H04B 10/27* (2013.01)
(52) U.S. Cl.
CPC ..................... *H04B 10/27* (2013.01)
(58) Field of Classification Search
CPC ....... H04B 10/27; H04B 10/272; H04L 12/44; H04L 47/24; H04Q 2011/0064; H04Q 11/0067
See application file for complete search history.

(56) References Cited

U.S. PATENT DOCUMENTS

| 7,693,429 B1 * | 4/2010 | Lowery | H04B 10/548 |
| | | | 398/192 |
| 2003/0103522 A1 * | 6/2003 | Hane | H04L 12/4015 |
| | | | 370/449 |

(Continued)

FOREIGN PATENT DOCUMENTS

| JP | 2014086902 | 5/2014 |
| JP | 2017212708 | 11/2017 |

OTHER PUBLICATIONS

[No Author Listed], "Basic Technology Course [GE-PON Technology] 3rd DBA Function," NTT Technical Journal, 2005, 17(10):67-70, 9 pages (with English Translation).

*Primary Examiner* — Tanya T Motsinger
(74) *Attorney, Agent, or Firm* — Fish & Richardson P.C.

(57) ABSTRACT

The present invention has an object to provide an uplink band allocation apparatus and an uplink band allocation method that are capable of setting an uplink band of a PON in accordance with an application.
The uplink band allocation apparatus and method according to the present invention collect not only the amount of the data accumulated in an ONU but also the information of the application (application information) used on a terminal apparatus. Then, the uplink band allocation apparatus and method according to the present invention reflect, on a DBA conducted by the OLT, information of a band and a delay (band delay information) that have been calculated by an application information acquisition server from the application information and that are demanded by the application.

7 Claims, 6 Drawing Sheets

(56) References Cited

U.S. PATENT DOCUMENTS

| | | | | |
|---|---|---|---|---|
| 2008/0263249 | A1* | 10/2008 | Watabe | G06F 13/1663 |
| | | | | 710/244 |
| 2011/0129223 | A1* | 6/2011 | Yoo | H04Q 11/0067 |
| | | | | 398/58 |
| 2012/0127947 | A1* | 5/2012 | Usui | H04W 72/51 |
| | | | | 370/329 |
| 2015/0201023 | A1* | 7/2015 | Kotab | H04L 65/613 |
| | | | | 709/208 |
| 2018/0316992 | A1* | 11/2018 | Zheng | H04B 10/25 |
| 2022/0294669 | A1* | 9/2022 | Park | H04L 25/0232 |
| 2023/0262060 | A1* | 8/2023 | Wang | H04Q 11/0067 |
| 2024/0022583 | A1* | 1/2024 | Miserendino | H04L 63/1425 |

* cited by examiner

UPBANDWIDTH ALLOCATION DEVICE AND UPLINK BANDWIDTH ALLOCATION METHOD

CROSS-REFERENCE TO RELATED APPLICATIONS

This application is a National Stage application under 35 U.S.C. § 371 of International Application No. PCT/JP2020/000194, having an International Filing Date of Jan. 7, 2020. The disclosure of the prior application is considered part of the disclosure of this application, and is incorporated in its entirety into this application.

TECHNICAL FIELD

The present disclosure relates to an apparatus and a method for conducting an uplink band allocation for an optical subscriber line terminating apparatus (optical netowork unit: ONU) in an optical subscriber line system (passive optical network: PON).

BACKGROUND ART

FIG. 1 is a diagram illustrating a communication system 400. In the communication system 400, a terminal apparatus 11 of a user is capable of starting the use of the Internet services via a PON 40. The PON 40 has a configuration in which an ONU 20 and an optical subscriber line terminal station apparatus (optical line terminal: OLT) 30 are connected through an optical transmission line (optical subscriber line section) 25. When the terminal apparatus 11 of the user is connected with the ONU 20, the terminal apparatus 11 of the user is connected with a network 50 via the PON 40, and is capable of using a service 70 on the network.

Here, in order to effectively utilize the band of the PON, the PON is provided with a dynamic bandwidth allocation (DBA) function (see, for example, NPL 1). The DBA function is to notify the OLT of the amount of data accumulated in the ONU in a REPORT frame, calculate the uplink band by the OLT, and notify the ONU of a transmission amount and a transmission start time in a GATE frame from the OLT.

CITATION LIST

Non Patent Literature

NPL 1: "Basic Technology Course [GE-PON Technology], Third Session, DBA Function", NTT Technical Review, pp. 67-70, October 2005

SUMMARY OF THE INVENTION

Technical Problem

As described above, the DBA function determines the band after the data is accumulated in the ONU. Hence, a waiting time (delay) is generated before the data is transmitted. However, some terminal applications have strict delay requirements. Nevertheless, the DBA function does not include a function for dynamically setting the band or the delay, based on the application information of the user terminal, and the PON has a difficulty in performing the band allocation in accordance with the application.

Therefore, in order to solve the above-described difficulty, the present invention has an object to provide an uplink band allocation apparatus and an uplink band allocation method that are capable of setting an uplink band of the PON in accordance with an application.

Means for Solving the Problem

To achieve the above-described object, an uplink band allocation apparatus according to the present invention includes an AP information acquisition server and a calculation unit for acquiring application information of a user terminal, and for dynamically allocating a band and a delay in accordance with the information that has been acquired.

Specifically, an uplink band allocation apparatus according to the present invention is an uplink band allocation apparatus for an optical subscriber line system, and the uplink band allocation apparatus includes an application information acquisition server; and a calculation unit. In the optical subscriber line system, a plurality of optical subscriber line terminating apparatuses (optical netowork units: ONUs) and an optical subscriber line terminal station apparatus (optical line terminal: OLT) are connected through an optical transmission line. The application information acquisition server calculates, when application information related to an application is notified from a terminal apparatus connected with an ONU of the ONUs, band delay information of a band demanded and a delay accepted by the application, and outputs the band delay information to the calculation unit. The calculation unit calculates a band and a delay for the ONU, based on the amount of data accumulated in the ONU and the band delay information from the application information acquisition server, and causes the OLT to conduct band notification and transmission permission for the ONU in accordance with the band and the delay.

In addition, an uplink band allocation method according to the present invention includes:
acquiring application information related to an application from a terminal apparatus connected with an ONU of the ONUs;
calculating band delay information of a band demanded and a delay accepted by the application when the application information is acquired;
calculating a band and a delay for the ONU, based on the amount of data accumulated in the ONU and the band delay information; and
causing the OLT to conduct band notification and transmission permission for the ONU in accordance with the band and the delay.

The uplink band allocation apparatus and method according to the present invention collect not only the amount of the data accumulated in the ONU but also the information of the application (application information) used on a terminal apparatus. Then, the uplink band allocation apparatus and method according to the present invention reflect, on a DBA conducted by the OLT, information of the band and the delay (band delay information) that have been calculated by the application information acquisition server from the application information and that are demanded by the application.

In the present invention, the band delay information can be reflected on the DBA conducted by the OLT, thereby enabling the provision of the uplink band allocation apparatus and the uplink band allocation method that are capable of setting the uplink band of the PON in accordance with the application.

The calculation unit of the uplink band allocation apparatus according to the present invention sets, in a case where the application information includes a specific signal, an allocation band to be allocated to the ONU to an accumulated amount of uplink data that has been accumulated in a buffer of the ONU, and makes a frequency of giving the transmission permission higher than in a case where the application information includes no specific signal.

The application information acquisition server of the uplink band allocation apparatus according to the present invention calculates, in a case where no specific signal is included in the application information that has been notified, no band delay information, and outputs nothing to the calculation unit, and the calculation unit calculates the band for the ONU, based on the amount of the data accumulated in the ONU, and causes the OLT to conduct the band notification and the transmission permission for the ONU in accordance with the band.

In the uplink band allocation apparatus according to the present invention, the OLT is caused to acquire the amount of the data and to conduct the band notification and the transmission permission on multi point control protocol (MPCP) of IEEE802.3ah.

Further, in the uplink band allocation method according to the present invention, in a case where the application information includes a specific signal, an allocation band to be allocated to the ONU is set to an accumulated amount of uplink data that has been accumulated in a buffer of the ONU, and a frequency of giving the transmission permission is made higher than in a case where the application information includes no specific signal.

In the uplink band allocation method according to the present invention, in a case where no specific signal is included in the application information or in a case where the application information is unable to be acquired, no band delay information is calculated, and the band for the ONU is calculated, based on the amount of the data accumulated in the ONU, and the band notification and the transmission permission is conducted for the ONU in accordance with the band.

In the uplink band allocation method according to the present invention, the OLT acquires the amount of the data and the OLT conducts the band notification and the transmission permission on multi point control protocol (MPCP) of IEEE802.3ah.

Note that each of the inventions described above can be combined with each other to the extent possible.

Effects of the Invention

The present invention enables the provision of an uplink band allocation apparatus and an uplink band allocation method that are capable of setting an uplink band of a PON in accordance with an application.

DESCRIPTION OF EMBODIMENTS

Embodiments of the present invention will be described with reference to the accompanying drawings. The embodiments described below are examples of the present invention and the present invention is not limited to the embodiments described below. Note that constituent elements with the same reference signs in the specification and the drawings are assumed to be the same constituent elements.

Purpose of the Invention

Figure 1:
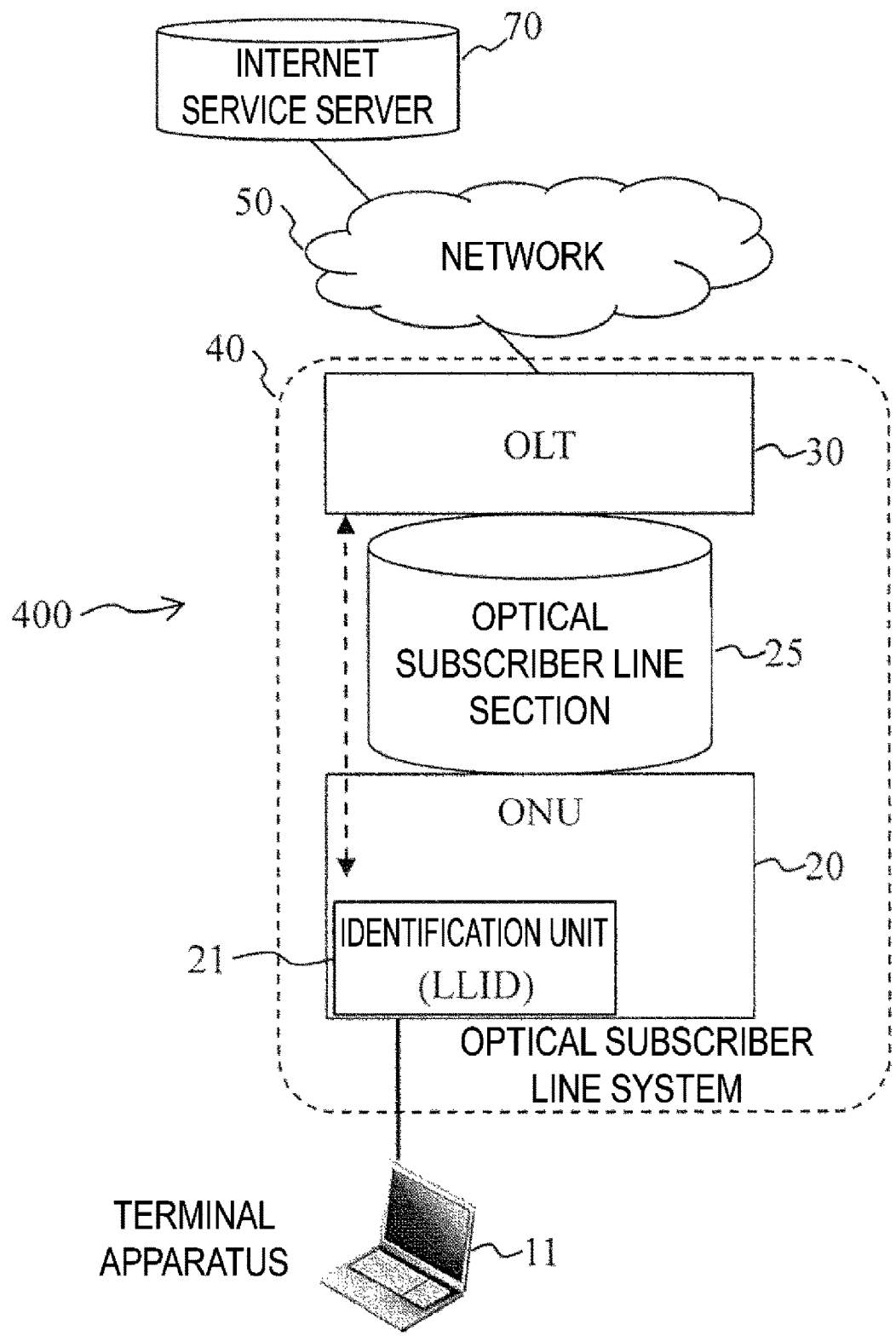
FIG. 1 is a diagram illustrating an example in which a terminal apparatus of a user starts using an Internet service via a PON.
Figure 2:
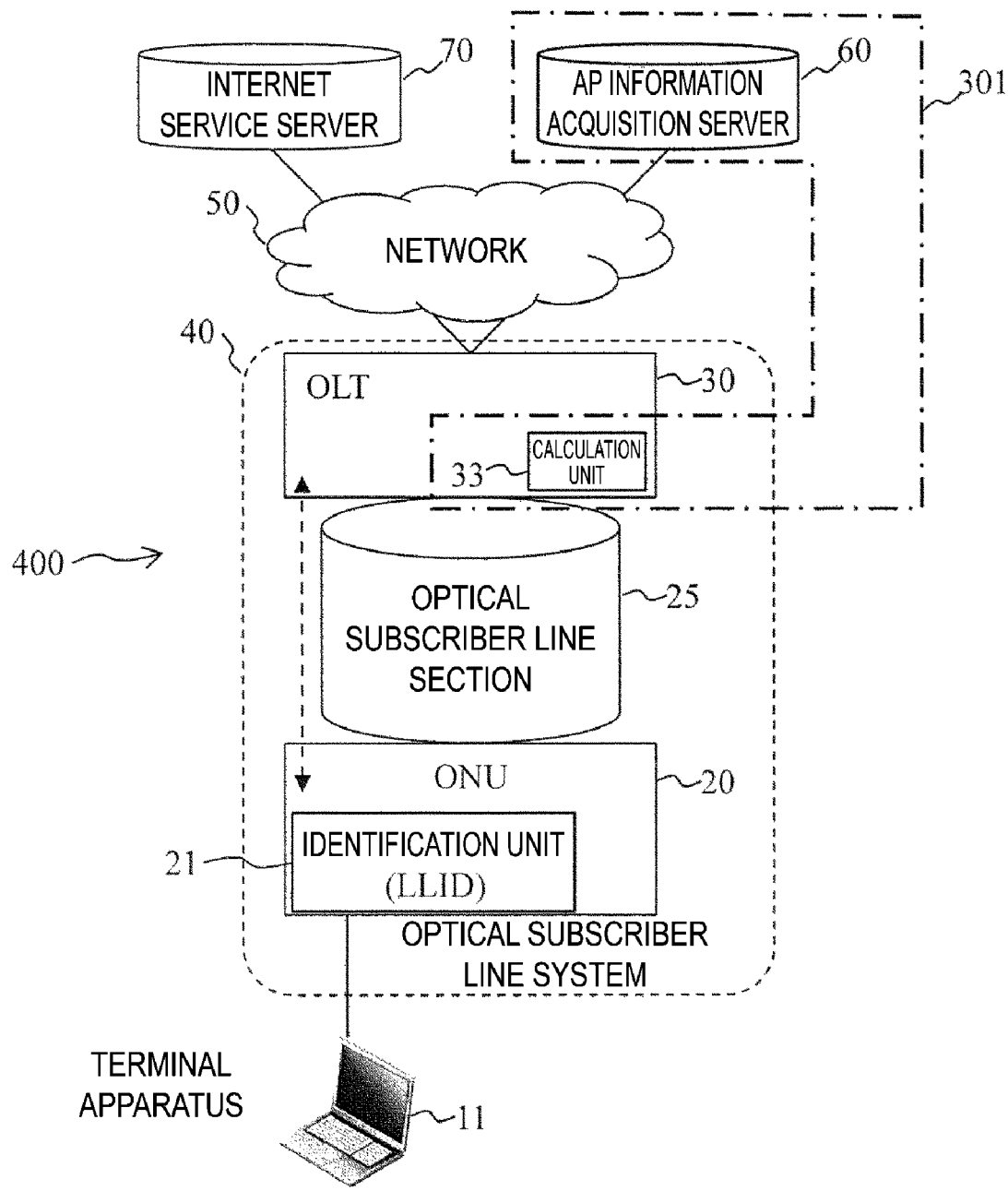
FIG. 2 is a diagram illustrating an uplink band allocation apparatus according to the present invention.

FIG. 2 is a diagram illustrating an uplink band allocation apparatus 301 according to a present embodiment. As illustrated in FIG. 2, the uplink band allocation apparatus 301 is incorporated into a communication system 400 as in FIG. 1. That is to say, the uplink band allocation apparatus 301 includes an application information acquisition server (AP information acquisition server) 60 and a calculation unit 33.

When application information (AP information) related to an application is notified from the terminal apparatus 11 connected with an ONU 20, the AP information acquisition server 60 calculates band delay information of a band demanded and a delay accepted by the application, and outputs the band delay information to the calculation unit 33. Note that the AP information acquisition server 60 may be installed inside the OLT 30, or may be installed outside the OLT 30.

The calculation unit 33 calculates a band and a delay of each ONU 200, based on the amount of data accumulated in the ONU 20 and the band delay information output from the AP information acquisition server 60. The calculation unit 33 causes the OLT 30 to conduct band notification and transmission permission for each ONU 20 in accordance with the band and the delay.

First, the AP information acquisition server 60 acquires AP information from the terminal apparatus 11. The AP information includes, for example, a protocol, a port number, and traffic information of the terminal apparatus. A technique by the AP information acquisition server 60 for acquiring the AP information includes a technique for querying the terminal apparatus 11 from the ONU 20 and a technique for notifying the ONU 20 from the terminal apparatus 11.

Subsequently, the AP information acquisition server 60 determines a band and a delay (band delay information) that are optimal for the application, based on the AP information. Then, the band delay information is reflected on DBA control of the OLT 30.

The OLT 30 conducts band calculation and band allocation from information that has been acquired in a REPORT frame from the ONU 20 (DBA control). For example, the DBA control can be realized with MPCP of IEEE802.3ah. In the present embodiment, the OLT 30 use, in addition to the REPORT frame, the band delay information from the AP information acquisition server 60 for the DBA control, and is thus capable of calculating the band in accordance with the application. Furthermore, the OLT 30 is also capable of conducting frame transmission frequency control (delay control) for each ONU, which is not conducted in the related art.

Function of PON

An optical subscriber line system (PON) 40 includes the ONU 20, an optical subscriber line section 25, and the OLT 30. The ONU 20 is physically connected with the OLT 30 via the optical subscriber line section 25. An identification unit 21 is, for example, a logical link identifier (LLID). Once the ONU 20 is authenticated based on the LLID, communication of the optical subscriber line section 25 between the ONU 20 and the OLT 30 is established. When the communication of the optical subscriber line section 25 is established, the terminal apparatus 11 is capable of connecting with the network 50 via the PON 40. In this manner, the use of an Internet service 70 is enabled.

Note that the identification unit 21 is not limited to the LLID, and an identification unit having another function and the LLID can be combined together.

Function of OLT

Figure 3:
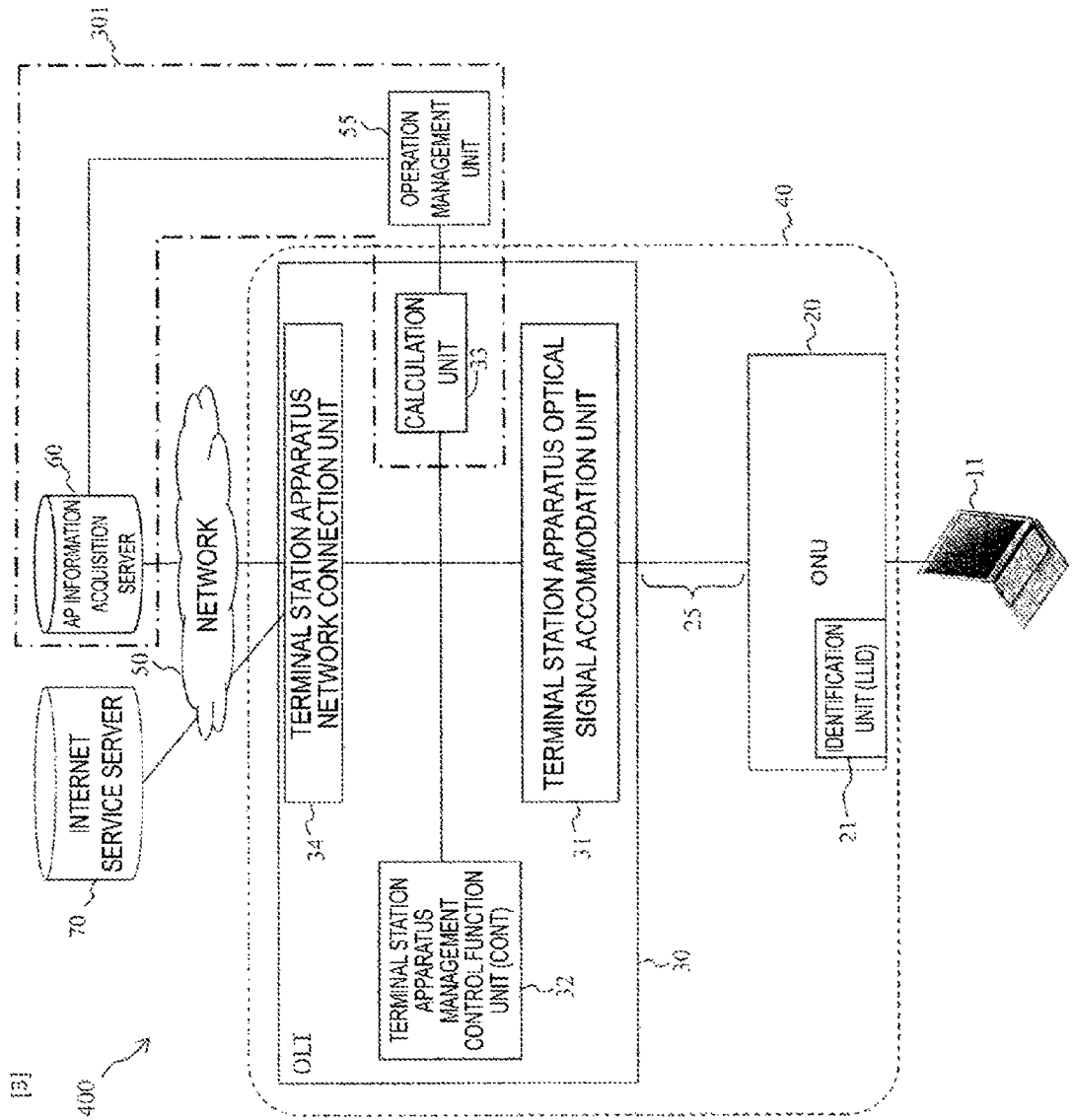
FIG. 3 is a diagram illustrating an OLT in combination with an uplink band allocation apparatus according to the present invention.

FIG. 3 is a diagram illustrating a configuration of the OLT 30. The OLT 30 includes a terminal station apparatus optical signal accommodation unit 31, a terminal station apparatus management control function unit (CONT: CONTrol) 32, the calculation unit 33, and a terminal station apparatus network connection unit 34. The terminal station apparatus optical signal accommodation unit 31 is connected with the terminal station apparatus network connection unit 34. The ONU 20 is connected with the terminal station apparatus optical signal accommodation unit 31 via the optical subscriber line section 25. The terminal station apparatus network connection unit 34 is also connected with the AP information acquisition server 60 and an Internet service server 70 through the network 50. That is to say, the ONU 20 uses a service of the Internet service server 70 via the terminal station apparatus optical signal accommodation unit 31, the terminal station apparatus network connection unit 34, and the network 50.

The calculation unit 33 acquires the amount of data accumulated in the ONU 20 and described in the Report frame that has been received from the ONU 20 via the terminal station apparatus optical signal accommodation unit 31. The calculation unit 33 calculates a band and a delay of the ONU 20, based on the amount of data, and notifies the CONT 32. The CONT 32 conducts the uplink band allocation and the delay control for each ONU 20 via the terminal station apparatus optical signal accommodation unit 31 in accordance with the band and the delay. Note that the CONT 32 exchanges an instruction system including the band allocation with the ONU 20. Any of the identification unit 21, the ONU 20, and the terminal apparatus 11 may be connected with a band allocation path of the OLT 30.

Function of Uplink Band Allocation Apparatus

The uplink band allocation apparatus 301 includes the AP information acquisition server 60 and the calculation unit 33. Furthermore, the uplink band allocation apparatus 301 may include an operation management unit 55. The AP information acquisition server 60 is connected with the OLT 30 through the network 50. In addition, the AP information acquisition server 60 is connected with the CONT 32 via the operation management unit 55 and the calculation unit 33.

When the ONU 20 acquires the AP information of the terminal apparatus 11, the AP information is notified to the AP information acquisition server 60 via the identification unit 21, the optical subscriber line section 25, the terminal station apparatus optical signal accommodation unit 31, the terminal station apparatus network connection unit 34, and the network 50. Here, the operation management unit 55 may instruct the CONT 32 to set, in the PON 40, a logical path for notifying the AP information acquisition server 60 of the AP information from the ONU 20.

Band Allocation Method

Figure 4:
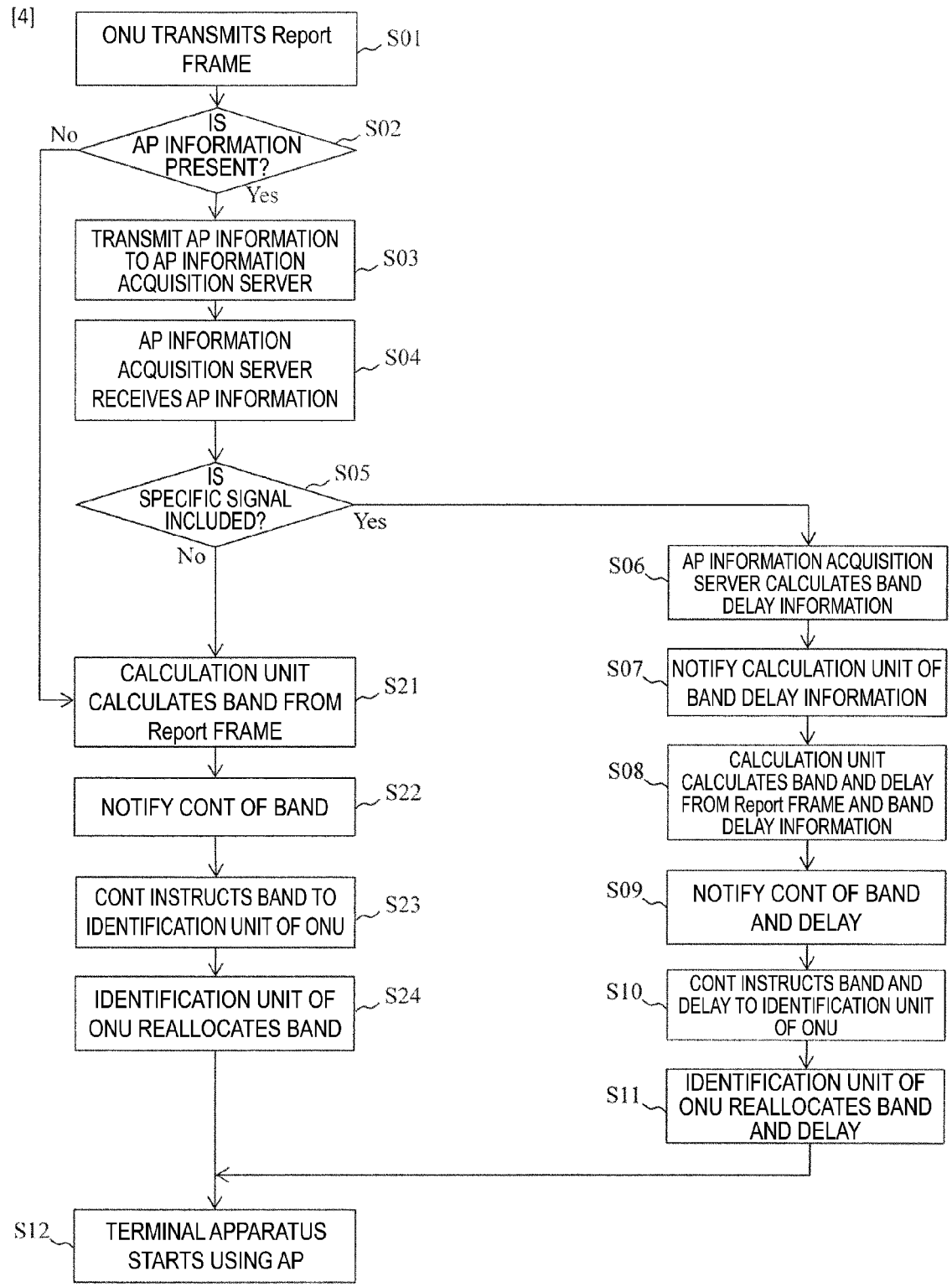
FIG. 4 is a flowchart illustrating an uplink band allocation method according to the present invention.
Figure 5:
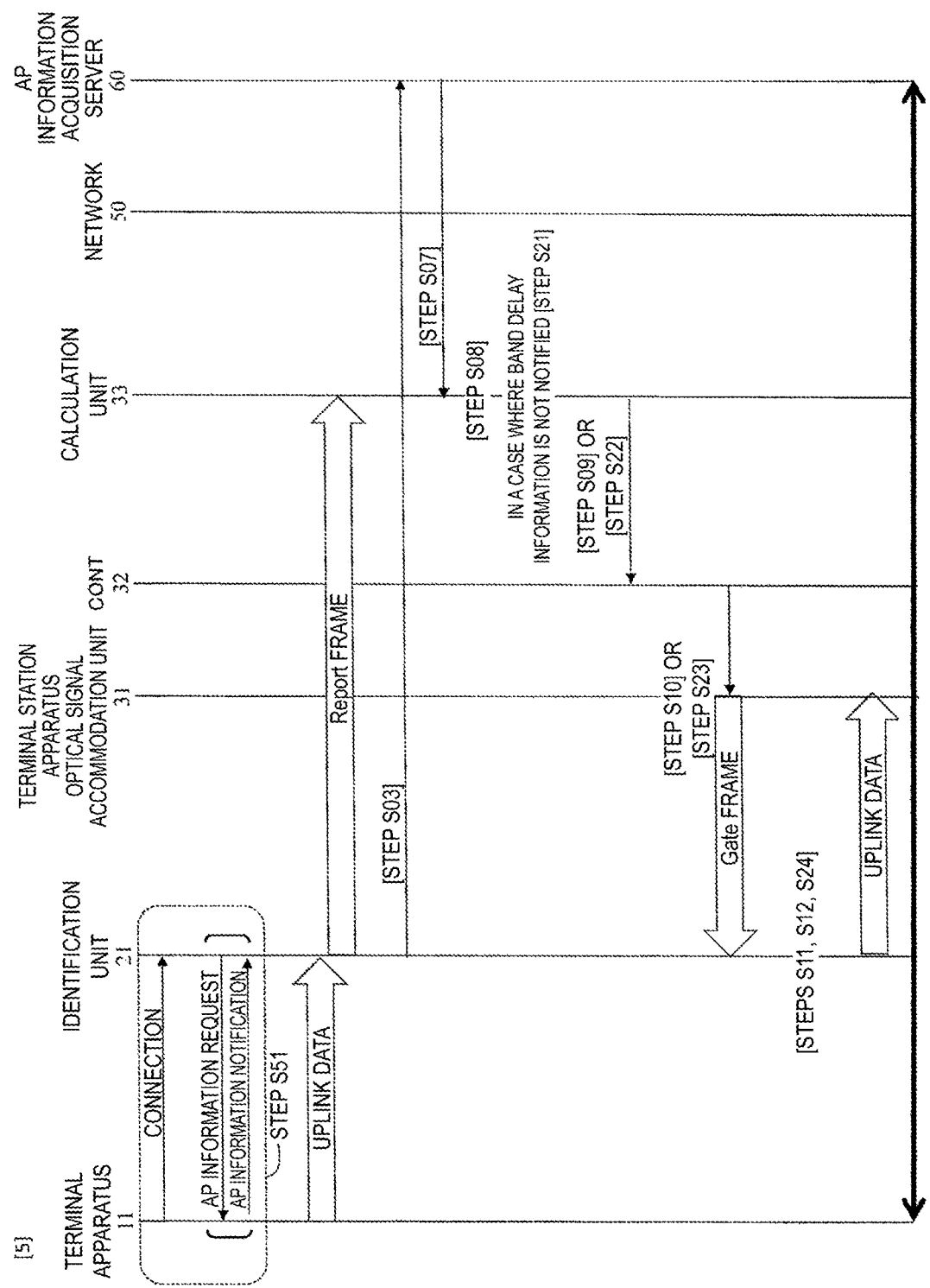
FIG. 5 is a sequence diagram illustrating the uplink band allocation apparatus according to the present invention.

FIG. 4 is a flowchart illustrating an uplink band allocation method performed by the uplink band allocation apparatus 301. FIG. 5 is a sequence diagram illustrating an operation of the communication system 400 including the uplink band allocation apparatus 301.

First, as in step S51 of FIG. 5, a case is supposed where the terminal apparatus 11 notifies the identification unit 21 in the ONU 20 of the AP information. The terminal apparatus 11 notifies the identification unit 21 of the AP information, when there is a request from the ONU 20 after the terminal apparatus 11 is connected with the ONU 20 or at the time of polling. In addition, the terminal apparatus 11 may notify the identification unit 21 of the AP information without waiting for the request from the ONU 20. A specific example of step S51 is as follows.

(1) ONU Side

It is assumed that the ONU 20 always acquires protocol information that passes through the PON 40 and the terminal apparatus 11. In this situation, the ONU 20 uses a timing of detection of a new protocol in comparing with the ordinary time as a trigger to request the AP information. Note that the apparatus for always acquiring the protocol information that passes through the PON 40 and the terminal apparatus 11 need not be the ONU 20, and may be a relay device such as a home gateway (HGW) for connecting the ONU 20 with the terminal apparatus 11.

(2) Terminal Apparatus Side

The use of a new protocol in comparing with the ordinary time triggers the ONU 20 to be notified of the AP information.

When the ONU 20 transmits the amount of accumulated data to the OLT 30 in a Report frame (step S01), the ONU 20 determines whether the AP information (a predetermined protocol or port number) has been acquired from the terminal apparatus 11 (step S02). In a case where the AP information is present ("Yes" in step S02), the ONU 20 transmits the AP information to the AP information acquisition server 60 via the OLT 30 (step S03). The AP information acquisition server 60 receives the AP information (step S04), and determines whether the AP information includes a specific signal (for example, VoIP, RTP protocol, and a specific port number) (step S05).

In a case where the AP information includes the specific signal ("Yes" in step 505), the AP information acquisition server 60 calculates a band demanded and a delay accepted by an application (the band delay information) (step S06). The AP information acquisition server 60 notifies the calculation unit 33 of the band delay information (step S07). The calculation unit 33 calculates the band and the delay, based on the band delay information that has been received from the AP information acquisition server 60 and the Report frame from the ONU 20 (step S08). The calculation unit 33 notifies the CONT 32 of the band and the delay that have been calculated (step S09). The CONT 32 instructs the band and the delay to the identification unit 21 of the ONU 20, based on a notification result (step S10), and the identification unit 21 reallocates the band and the delay (step S11). The terminal apparatus 11 starts using the application with a new band and a new delay (step S12).

Note that the OLT 30 controls the delay with a frequency of giving transmission permission. That is to say, the OLT 30 adjusts a transmission waiting time by the frequency of giving transmission permission, and controls the delay.

On the other hand, in a case where the ONU 20 has not acquired the AP information ("No" in step S02), and in a case where the specific signal is not included in the AP information that has been received by the AP information acquisition server 60 ("No" in step 505), the flow of the uplink band allocation is the same flow as the normal DBA flow. That is, the ONU 20 does not transmit the AP information to the AP information acquisition server 60, and the AP information acquisition server 60 does not notify the calculation unit of the band delay information. The calculation unit 33 determines the band, based on the Report frame from the ONU 20 (step S21). The calculation unit 33 notifies the CONT 32 of the band that has been calculated (step S22). The CONT 32 instructs the band to the identification unit 21 of the ONU 20, based on a notification result (step S23), and the identification unit 21 reallocates the band (step S24). The terminal apparatus 11 starts using the application with a new band and a new delay (step S12).

DBA

Figure 6:
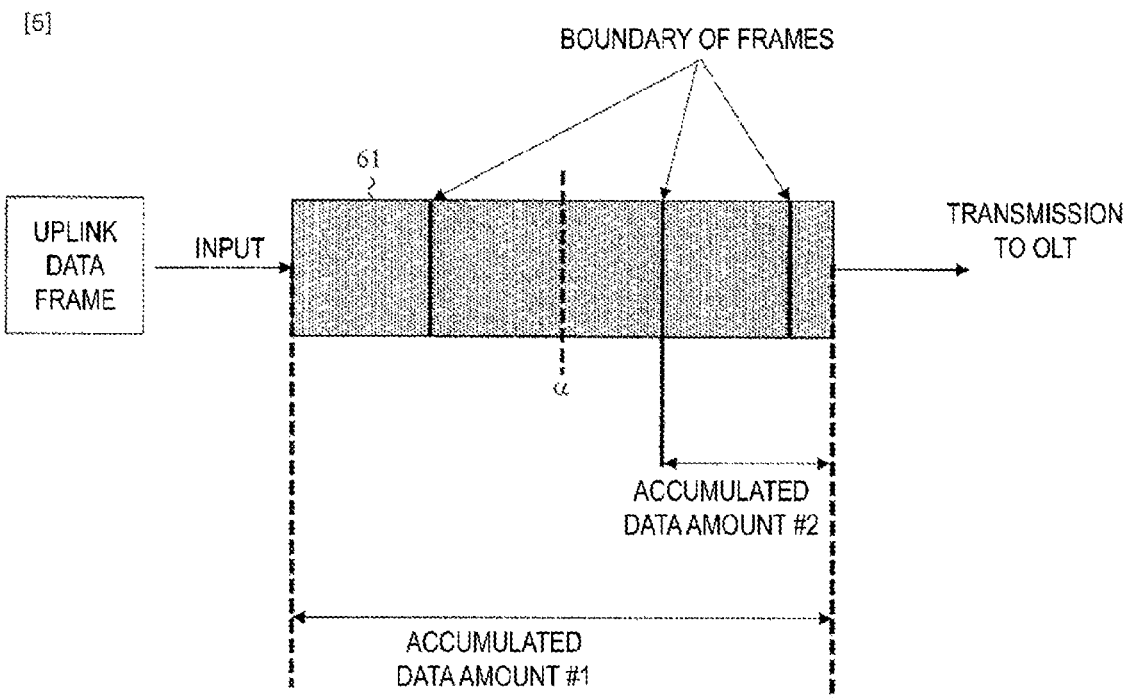
FIG. 6 is a diagram illustrating a DBA algorithm.

FIG. 6 is a diagram illustrating an algorithm of the DBA disclosed in NPL 1. The entire accumulated amount of data of an uplink buffer 61 of the ONU 20 is set to an accumulated data amount #1. The accumulated amount of data of a preset threshold value a or less and up to a boundary of a data frame closest to the threshold value a is set to an accumulated data amount #2. The ONU 20 writes values of both the accumulated data amounts #1 and #2 in the Report frame, and transmits the Report frame. The OLT 30 selects either one of the two values as an allocation band according to the following conditions.

(1) In a case where the number of the ONUs in communication is greater than a predetermined value, the allocation band is set to the accumulated data amount #2.

(2) Otherwise, the allocation band is set to the accumulated data amount #1.

The uplink band allocation apparatus 301 adds the following algorithm to the above algorithm.

In a case where a specific signal is included in the AP information, the calculation unit 33 sets the allocation band to be allocated to the ONU 20 to an accumulated amount of uplink data that has been accumulated in a buffer of the ONU 20, and makes the frequency of giving transmission permission higher than in a case where no specific signal is included in the AP information.

Upon detection of a specific signal (VoIP or RTP protocol) from the AP information (port or protocol information), the AP information acquisition server 60 instructs the calculation unit 33 to increase the rank of the allocation band and the frequency of giving transmission permission. Specifically, both of the following operations are performed.

(3) Once the specific signal is detected, the allocation band is set to the accumulated data amount #1.

(4) Once the specific signal is detected, the frequency of giving transmission permission is increased to maintain the transmission waiting time within a certain time.

Effects

The uplink band allocation apparatus 301 is an apparatus that can be added to the PON that is currently installed, is capable of acquiring the application information of the terminal apparatus 11, and is capable of dynamically allocating a band of the PON and a delay in accordance with the information that has been acquired. The uplink band allocation apparatus 301 is capable of providing a network resource in accordance with an application (e-sports, video) of the terminal apparatus 11.

REFERENCE SIGNS LIST

11: Terminal apparatus
20: ONU
21: Identification unit
25: Optical subscriber line section
30: OLT
31: Terminal station apparatus optical signal accommodation unit
32: Terminal station apparatus management control function unit (CONT)
33: Calculation unit
34: Terminal station apparatus network connection unit
40: PON
50: Network
55: Operation management unit
60: AP information acquisition server
70: Internet service server
301: Uplink band allocation apparatus
400: Communication system The invention claimed:

1. An uplink band allocation apparatus for an optical subscriber line system, the uplink band allocation apparatus comprising:
    an application information acquisition server including one or more processors; and
    a calculation unit including one or more processors,
    wherein
    in the optical subscriber line system, a plurality of optical network units (ONUs) and an optical line terminal (OLT) are connected through an optical transmission line,
    the application information acquisition server is configured to calculate, when application information related to an application is notified from a terminal apparatus connected with an ONU of the ONUs, band delay information of a band demanded and a delay accepted by the application, and output the band delay information to the calculation unit, and
    the calculation unit is configured to:
        calculate a band and a delay for the ONU, based on the amount of data accumulated in the ONU and the band delay information from the application information acquisition server, and cause the OLT to conduct band notification and transmission permission for the ONU in accordance with the band and the delay; and
        determine that the application information includes a specific signal, and in response, set an allocation band to be allocated to the ONU to an accumulated amount of uplink data that has been accumulated in a buffer of the ONU, and increase a frequency of giving the transmission permission.

2. The uplink band allocation apparatus according to claim 1, wherein the OLT is caused to acquire the amount of the data and to conduct the band notification and the transmission permission on multi point control protocol (MPCP) of IEEE802.3ah.

3. The uplink band allocation apparatus according to claim 1, wherein the specific signal includes a Voice over Internet Protocol (VoIP).

4. The uplink band allocation apparatus according to claim 1, wherein the specific signal includes a Real-time Transport Protocol (RTP).

5. The uplink band allocation apparatus according to claim 1, wherein the specific signal includes a specific port number.

6. An uplink band allocation method for an optical subscriber line system,
    a plurality of optical network units (ONUs) and an optical line terminal (OLT) being connected through an optical transmission line in the optical subscriber line system, the uplink band allocation method comprising:
    acquiring application information related to an application from a terminal apparatus connected with an ONU of the ONUs;
    calculating band delay information of a band demanded and a delay accepted by the application when the application information is acquired;

calculating a band and a delay for the ONU, based on the amount of data accumulated in the ONU and the band delay information;

causing the OLT to conduct band notification and transmission permission for the ONU in accordance with the band and the delay; and determining that the application information includes a specific signal, and in response, setting an allocation band to be allocated to the ONU to an accumulated amount of uplink data that has been accumulated in a buffer of the ONU, and increasing a frequency of giving the transmission permission.

7. The uplink band allocation method according to claim 6, wherein the OLT acquires the amount of the data and the OLT conducts the band notification and the transmission permission on multi point control protocol (MPCP) of IEEE802.3ah.

* * * * *